(12) United States Patent
Lotha

(10) Patent No.: US 10,866,037 B2
(45) Date of Patent: Dec. 15, 2020

(54) PROCESS VALVE MANIFOLD AND HEAT EXCHANGER SYSTEM

(71) Applicant: Buerkert Werke GmbH, Ingelfingen (DE)

(72) Inventor: Hartmuth Lotha, Kupferzell (DE)

(73) Assignee: BUERKERT WERKE GMBH

( * ) Notice: Subject to any disclaimer, the term of this patent is extended or adjusted under 35 U.S.C. 154(b) by 0 days.

(21) Appl. No.: 15/012,451

(22) Filed: Feb. 1, 2016

(65) Prior Publication Data

US 2016/0238327 A1 Aug. 18, 2016

(30) Foreign Application Priority Data

Feb. 5, 2015 (DE) .................... 20 2015 100 550 U

(51) Int. Cl.
| | | |
|---|---|---|
| *F28F 13/06* | (2006.01) | |
| *B60H 1/00* | (2006.01) | |
| *F01P 7/16* | (2006.01) | |
| *F16K 27/00* | (2006.01) | |

(52) U.S. Cl.
CPC ......... *F28F 13/06* (2013.01); *B60H 1/00485* (2013.01); *B60H 1/00878* (2013.01); *F01P 7/161* (2013.01); *F16K 27/003* (2013.01)

(58) Field of Classification Search
CPC .... F01P 7/16; F01P 7/146; F01P 7/165; F01P 2060/08; F01P 2060/18; F01P 2060/48; F01P 2060/185; F01P 2050/24; F01P 2007/146; F01P 7/161; F28D 2021/0077; F28D 2021/0091; F28D 2021/008; F02M 26/23; B60H 1/00878; B60H 1/00885; B60H 1/00485; F16K 27/003

USPC ...................................................... 123/41.08
See application file for complete search history.

(56) References Cited

U.S. PATENT DOCUMENTS

| | | | | |
|---|---|---|---|---|
| 5,497,941 A | * | 3/1996 | Numazawa | B60H 1/004 165/43 |
| 6,273,033 B1 | * | 8/2001 | Enander | B60H 1/025 123/41.08 |
| 6,457,442 B1 | * | 10/2002 | Fuchs | F01P 3/20 123/41.29 |

(Continued)

FOREIGN PATENT DOCUMENTS

| | | |
|---|---|---|
| CN | 101734142 A | 6/2010 |
| CN | 102221101 A | 10/2011 |

(Continued)

OTHER PUBLICATIONS

German Search Report dated Nov. 5, 2015 from corresponding Application No. DE 20 2015 100 550.4, 5 pages.

*Primary Examiner* — Jianying C Atkisson
*Assistant Examiner* — For K Ling
(74) *Attorney, Agent, or Firm* — Dilworth IP, LLC

(57) ABSTRACT

A process valve manifold comprises an inlet for a heat transfer medium, a main outlet for the heat transfer medium, a main duct extending between the inlet and the main outlet, ports for secondary circuits, a 3/2-way valve which is arranged in the main duct, and a bypass outlet. The 3/2-way valve is switchable between different positions. The positions determine a flow cross-section by which the bypass outlet and the main outlet are in communication with the main duct. The manifold further comprises control valves for determining a flow cross-section between the main duct and the ports for the secondary circuits.

14 Claims, 1 Drawing Sheet

(56) References Cited

U.S. PATENT DOCUMENTS

| | | | | |
|---|---|---|---|---|
| 6,688,262 B2* | 2/2004 | Murakami | ............... | F01P 3/20 123/41.1 |
| 6,712,028 B1* | 3/2004 | Robbins | ................ | F01P 7/161 123/41.08 |
| 7,011,049 B2* | 3/2006 | Tomasseli | ............ | F02M 26/33 123/41.02 |
| 7,721,683 B2* | 5/2010 | Lutz | ......................... | F01P 3/02 123/41.1 |
| 8,370,052 B2* | 2/2013 | Lin | .......................... | F01P 11/16 123/41.08 |
| 8,555,826 B2* | 10/2013 | Feldhaus | ................. | F01P 3/20 123/41.02 |
| 8,979,474 B2* | 3/2015 | Hoji | ....................... | F01P 7/161 415/204 |
| 2001/0045103 A1* | 11/2001 | Khelifa | ................. | B60H 1/143 62/244 |
| 2011/0174243 A1* | 7/2011 | Adam | .................... | F01P 7/165 123/41.1 |
| 2011/0232590 A1* | 9/2011 | Benet | ....................... | F01P 3/02 123/41.09 |
| 2012/0076637 A1 | 3/2012 | Hoji | | |

FOREIGN PATENT DOCUMENTS

| | | | | |
|---|---|---|---|---|
| DE | 3447182 A2 | 6/1986 | | |
| DE | 19513248 A1 * | 10/1996 | ............... | F01P 7/16 |
| DE | 19753915 A1 | 6/1998 | | |
| EP | 1291206 A1 * | 3/2003 | ......... | B60H 1/00007 |
| EP | 1354734 A1 * | 10/2003 | ......... | B60H 1/00371 |
| EP | 1441160 A2 | 7/2004 | | |
| EP | 2192286 A2 * | 6/2010 | ............... | F01P 9/06 |
| FR | 2846715 A1 * | 5/2004 | ......... | B60H 1/00885 |
| WO | 2003048539 A1 | 6/2003 | | |
| WO | WO 03048539 A1 * | 6/2003 | ............... | F01P 5/10 |

* cited by examiner

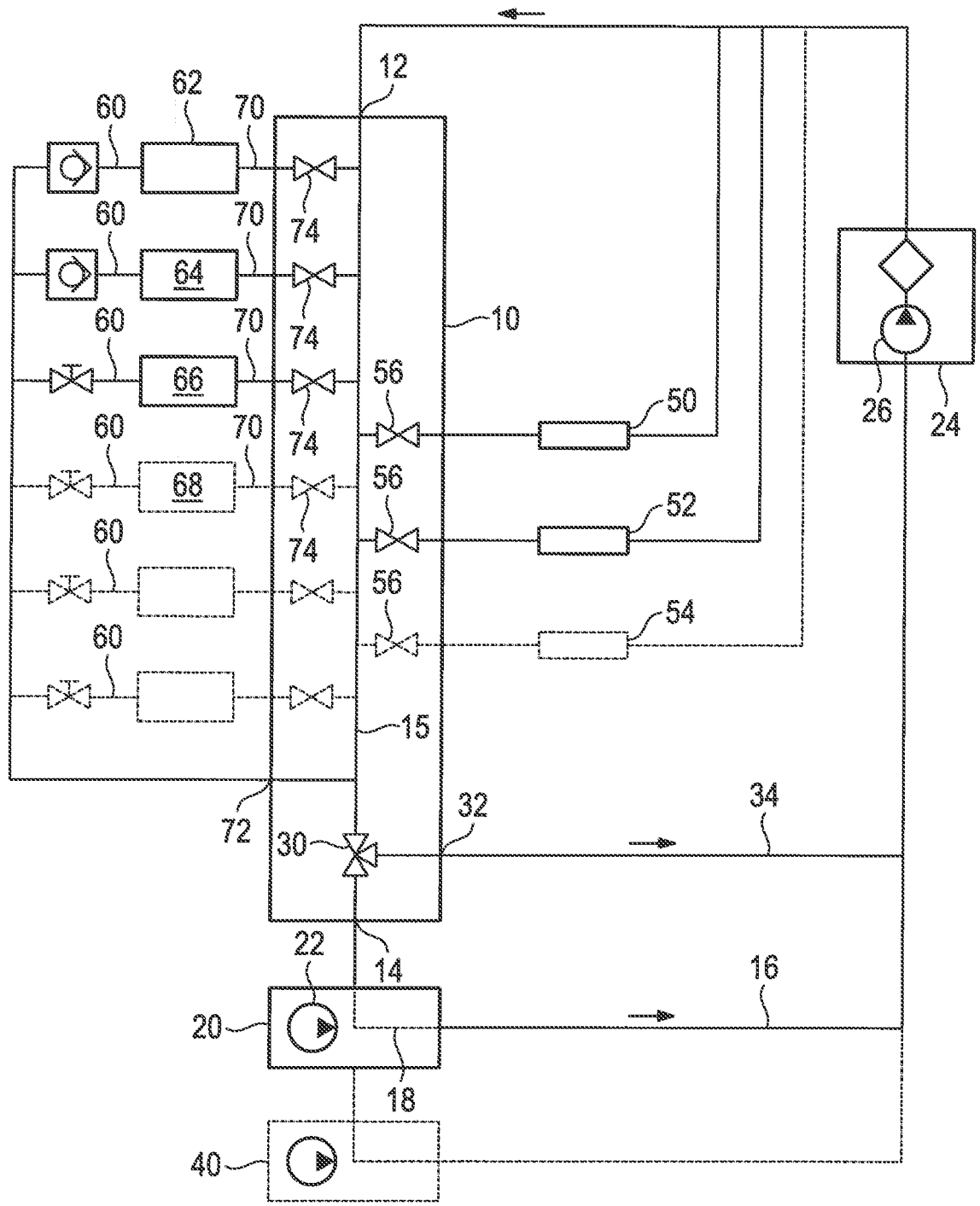

PROCESS VALVE MANIFOLD AND HEAT EXCHANGER SYSTEM

The invention relates to a process valve manifold and to a heat exchanger system.

BACKGROUND OF THE INVENTION

A process valve manifold is a module which has a plurality of process valves integrated therein. Hereby, a plurality of ports can be controlled independently of one another as desired. The invention more particularly relates to a process valve manifold as is used for heat exchanger systems. The heat exchanger systems involved may be more particularly of the type as used in motor vehicles, One example of such a process valve manifold is found in EP 1 441 160.

The object of the invention is to further develop the known process valve manifold to the effect that it allows a highly integrated thermal management, combined with a compact structure.

BRIEF DESCRIPTION OF THE INVENTION

To achieve this object, provision is made according to the invention for a process valve manifold comprising an inlet for a heat transfer medium, a main outlet for the heat transfer medium, a main duct extending between the inlet and the main outlet, ports for secondary circuits, a 3/2-way valve which is arranged in the main duct, and a bypass outlet. The 3/2-way valve is switchable between different positions. The positions determine a flow cross-section by which the bypass outlet and the main outlet are in communication with the main duct. The manifold further comprises control valves for determining a flow cross-section between the main duct and the ports for the secondary circuits. Use of the 3/2-way valve allows the flow path of the heat transfer medium to be continuously varied within the process valve manifold between a state in which all of the heat transfer medium leaves the process valve manifold through the main outlet, a state in which all of the heat transfer medium leaves the process valve manifold through the bypass outlet, and any desired distribution of the heat transfer medium between these two outlets. Here, no external pipes or different module blocks are required, but all of the flow ducts are integrated in the process valve manifold.

A plurality of ports for secondary circuits are preferably also integrated in the process valve manifold. This allows for connecting various heat consumers and heat generators such as, e.g., a defrosting heat exchanger, a roof heater, a radiator, a retarder, an exhaust gas heat exchanger, a compressor cooler, a battery heater, or other components.

According to one configuration of the invention, at least one throttle is arranged in the main duct. The throttle can be used for adjusting a desired pressure gradient, so that, for example, a circulation is obtained in one of the secondary circuits without taking any further measures.

According to the invention, provision is also made for a heat exchanger system including such a process valve manifold, a fluid communication existing between the main outlet and the inlet of the process valve manifold and running through a cooling duct of a prime mover. In this configuration, the process valve manifold is made use of for building up and controlling a highly integrated heat exchanger circuit, the heat input into the heat exchanger system being effected by means of the prime mover or a different source of heat. Typical prime movers are internal combustion engines or electric motors. The heat consumption may be either performed by heat exchangers by means of which the waste heat of the prime mover is dissipated to the environment, or by various secondary circuits which are used for producing a heating effect, when necessary, for example for the defrosting of windowpanes, for heating sleeping berths or the driver's cabin, or for operating a heater.

According to one configuration of the invention, provision is made that the fluid communication runs through an auxiliary heater. This allows the heat exchanger circuit to be supplied with heat when the prime mover does not yet generate a sufficient amount of waste heat to be able to provide it to the heat consumers of the secondary circuits in the desired manner.

Provision may also be made that the fluid communication runs through a cooler. This allows heat to be extracted from the heat exchanger circuit when the secondary circuits are to be used for cooling (for example in a refrigerated truck).

A pump may also be arranged in the fluid communication. This pump provides for the desired circulation.

According to one configuration of the invention, provision is made that at least one of the secondary circuits is connected to the process valve manifold by means of two ports between which a pressure gradient prevails when the heat transfer medium flows through the main duct, so that a circulation develops in the secondary circuit. In this configuration, production of the circulation in the secondary circuit by active components such as, e.g., a pump may possibly be dispensed with.

In principle, however, it is also possible for a pump to be arranged in the secondary circuit. The pump ensures that the circulation in the secondary circuit is effected at the desired flow rate, so that the desired quantity of heat can reliably be transported to a heat consumer.

According to one configuration of the invention, provision may also be made that the secondary circuit is routed to the heat consumer and back to the process valve manifold such that a circulation develops by natural convection. In this configuration, the difference in the specific weight of the heat transfer medium upstream and downstream of the heat consumer is made use of to produce the desired circulation by the change in density when the cooling medium has been heated or by a suitable pipe routing, without any active components such as a pump, for example.

According to one embodiment, it may be provided for that the process valve manifold is subdivided into a plurality of partial modules which can be mounted separately from each other. This allows for reacting to vehicle-specific facts and circumstances by mounting a partial module in the front area, a partial module in the center area and a partial module in the rear area, for example.

BRIEF DESCRIPTION OF THE DRAWINGS

FIG. 1 schematically shows one embodiment of a process valve manifold of the invention in an undivided state.

DETAILED DESCRIPTION OF THE INVENTION

The invention will be described below with reference to an embodiment which is illustrated in the accompanying drawing, which schematically shows a heat exchanger system according to the invention with a process valve manifold according to the invention.

The single FIGURE schematically shows a process valve manifold 10 in an undivided state, which is provided with an inlet 12 for a heat transfer medium and a main outlet 14 for the heat transfer medium. A main duct 15 extends between the inlet 12 and the main outlet 14.

A fluid communication 16 extends from the main outlet 14 of the process valve manifold 10 to the inlet 12 and runs through a cooling duct 18 of a schematically illustrated prime mover 20, for instance an internal combustion engine or an electric motor. Thus, when a heat transfer medium circulates in the fluid communication 16, the waste heat of the prime mover will be removed from it.

A coolant pump 22 may be arranged within the prime mover 20.

The fluid communication 16 runs through an auxiliary heater 24 which is shown schematically here and which may optionally be provided with an internal pump 26. The auxiliary heater 24 is adapted to introduce additional thermal energy into the system and may, for example, contain a diesel heater.

As an alternative to the auxiliary heater 24 or in addition, a cooler (not shown here) may be provided which can be used for extracting thermal energy from the system. The cooler may contain a refrigerating machine, for example.

Arranged in the main duct 15 within the process valve manifold 10 is a 3/2-way valve 30 one port of which leads to a bypass outlet 32. A bypass flow pipe 34 extends from the bypass outlet 32 to the fluid communication 16, so that the bypass flow pipe 34 opens into it downstream of the auxiliary heater 24.

Further heat sources may be provided in parallel to the prime mover 20; a heat source 40 is shown schematically here, for example a second prime mover.

Various heat exchangers 50, 52, 54 are connected to the fluid communication 16, one of their respective connections being effected directly via the process valve manifold 10, In the exemplary embodiment shown, the respective downstream connection of the heat exchangers 50, 52, 54 is each connected to the main duct 15 by a control valve 56 which is integrated in the process valve manifold 10.

Further connected to the process valve manifold 10 are various secondary circuits 60 in each of which a heat consumer 62, 64, 66, 68 is arranged. The heat consumers 62, 64, 66, 68 may be, for example, a defrosting device, a roof heating, a radiator or some other component which can be made use of for heating (or cooling) different components or portions of a motor vehicle, In the illustrated exemplary embodiment, the upstream ends of the heat consumers 62, 64, 66, 68 are directly connected to a port 70 of the valve manifold, whereas the downstream connections are combined to be conducted back again to the process valve manifold 10 via a shared port 72. A respective control valve 74 is located within the process valve manifold between the ports 70 and the main duct 15 and serves to control the flow from the main duct 15 to the appropriate port 70.

The heat consumers 62, 64, 66, 68 may be positioned on a portion of the vehicle that can be uncoupled, for example on a trailer, semitrailer or wagon. To allow an uncoupling process, some or all of the secondary circuits may be provided with valves, pump modules, check valves or quick-action couplings. These devices are fitted between the ports 70 and 72. As a result, all or individual ones of the secondary circuits 60 can be uncoupled without the system having to be drained and refilled again.

The necessary pressure differential between the upstream ports 70 and the downstream port 72 of the secondary circuits 60 can be established, for instance, in that a throttle is provided at a suitable place in the main duct 15. Alternatively and/or additionally, it is possible to provide a pump within the secondary circuits, which is adapted to be used either independently for each individual secondary circuit or as a suction pump downstream of the heat consumers 62, 64, 66, 68 in the common pipe towards the port 72. It is also possible to arrange the heat consumers 62, 64, 66, 68 above the process valve manifold 10 such that a circulation arises in the secondary circuit by natural convection, that is, based on the differences in the specific weight of the heat transfer medium upstream and downstream of the heat consumer.

The process valve manifold 10 is the central element of the heat exchanger system described, which may be employed in a utility vehicle. It is particularly by means of the integrated 3/2-way valve 30 that the thermal management can be optimized.

Using the process valve manifold 10, it can be ensured in the various operating modes, for example during standstill, during startup, during nominal operation, during long-term operation, during short-term operation, during pauses and during follow-up operation, by means of sensory detection at the heat circuits to be open-loop controlled or closed-loop controlled that the required operating temperatures are reliably observed, taking into account the specific heat quantity potentials and aggregate-specific special features (temperature response curves, limit values, heat absorption behavior and heat emission behavior).

For instance, the main outlet can be disconnected from the main duct 15 by the 3/2-way valve after a cold start, so that the heat transfer medium will not circulate through the cold prime mover (in particular a cold internal combustion engine), but through the bypass 34 directly to the auxiliary heater 24 where it can be heated faster. This allows to make heat available to the heat consumers comparatively quickly. The auxiliary heater 24 may also be used to bring the prime mover 20 to a desired temperature in order to prevent or to improve a cold start of the prime mover 20.

When the prime mover 20 has reached a particular temperature, the 3/2-way valve can be opened with a speed that is predefined by the control, so that the volume flow through the cooling duct 18 gradually increases. Here, the 3/2-way valve 30 is operated in the long term such that a volume flow of heat transfer medium through the cooling duct 18 of the prime mover 20 is reached such that the waste heat generated is dissipated in the desired manner. At the same time, the control valves 56 can be suitably driven such that that portion of the waste heat of the prime mover that is not consumed by the heat consumers 62, 64, 66, 68 is given off to the environment by means of the heat exchangers 50, 52, 54.

The efficiency of the system is very high since all of the connections are integrated in the process valve manifold 10, so that an energetically and spatially combined heat exchanger system is provided by means of which an optimally adjusted thermal management can be implemented. In this way, sections that up to now were configured as independent modules are linked in terms of energy engineering, resulting in an increase in the overall efficiency of the system.

Different valve drives can be used for the different control valves and for the 3/2-way valve, such as, e.g., electromotive, electropneumatic, electromagnetic or mechanical.

The invention claimed is:

1. A process valve manifold comprising an inlet for a heat transfer medium, a main outlet for said heat transfer medium, a main duct extending between said inlet and said main outlet, ports for secondary circuits, a 3/2-way valve which is arranged in said main duct, a bypass outlet, said 3/2-way valve having 3 ports and being switchable between different positions, said positions determining a flow cross-section by which said bypass outlet and said main outlet are in communication with said main duct, said positions being continuously variable between a state in which all of the heat transfer medium leaves the process valve manifold through the main outlet and a state in which all of the heat transfer medium leaves the process valve manifold through the bypass outlet, and comprising control valves for determining a flow cross-section between said main duct and said ports for secondary circuits, wherein the main outlet of the process valve manifold is connectable to a fluid communication extending from the main outlet to the inlet and running through a cooling duct of a prime mover, and wherein the bypass outlet is connectable to a bypass flow pipe extending from the bypass outlet to the fluid communication, which bypass flow pipe opens into the fluid communication downstream of the prime mover.

2. The process valve manifold of claim 1 wherein branches are being provided for connecting said main duct to said secondary circuits, said branches being arranged between said inlet and said 3/2-way valve.

3. The process valve manifold of claim 1 wherein at least one throttle is arranged in said main duct.

4. The process valve manifold of claim 1 wherein a plurality of partial modules is being provided, said partial modules being adapted for being mounted separately from each other, said partial modules in combination forming said process valve manifold.

5. A heat exchanger system comprising a process valve manifold with an inlet for a heat transfer medium, a main outlet for said heat transfer medium, a main duct extending between said inlet and said main outlet, ports for secondary circuits, and a 3/2-way valve which is arranged in said main duct, and a bypass outlet, said 3/2-way valve having 3 ports and being switchable between different positions, said positions determining a flow cross-section by which said bypass outlet and said main outlet are in communication with said main duct, and comprising control valves for determining a flow cross-section between said main duct and said ports for secondary circuits, wherein a fluid communication exists between said main outlet and said inlet of the process valve manifold, said fluid communication running through a cooling duct of a prime mover, and a bypass flow pipe extends from the bypass outlet to a point along the fluid communication downstream of the prime mover at which point the bypass outlet opens into the fluid communication.

6. The heat exchanger system of claim 5 wherein said fluid communication runs through an auxiliary heater.

7. The heat exchanger system of claim 5 wherein said fluid communication runs through a cooler.

8. The heat exchanger system of claim 5 wherein a pump is arranged in said fluid communication.

9. The heat exchanger system of claim 5 wherein at least one heat consumer is connected to said process valve manifold by means of a secondary circuit.

10. The heat exchanger system of claim 9 wherein said secondary circuit is connected to said process valve manifold by means of two ports.

11. The heat exchanger system of claim 10 wherein when said heat transfer medium flows through said main duct a pressure gradient prevails between said ports so that a circulation develops in said secondary circuit.

12. The heat exchanger system of claim 10 wherein a pump is arranged in said secondary circuit.

13. The heat exchanger system of claim 10 wherein said secondary circuit is routed to said heat consumer and back to said process valve manifold such that a circulation develops by natural convection.

14. The heat exchanger system of claim 10 wherein said secondary circuit is controllable by means of at least one of said control valves integrated in said process valve manifold.

* * * * *